United States Patent Office 2,795,577
Patented June 11, 1957

1

2,795,577
DISAZO COMPOUNDS

James F. Feeman, West Reading, Pa., assignor to Althouse Chemical Co., Worcester, Mass., a corporation of Massachusetts No Drawing. Application July 6, 1956,
Serial No. 596,149

11 Claims. (Cl. 260—153)

This invention relates to a new class of disazo compounds which are especially useful as dyes and as dye intermediates for reasons mentioned more fully hereinafter.

The new disazo compounds have the following general structure:

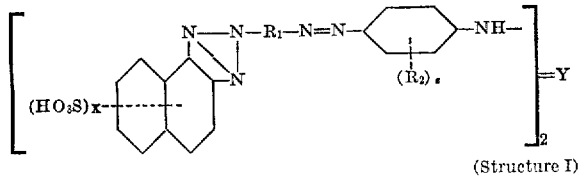

(Structure I)

wherein X is a whole number less than 4; $R_1$ is a radical selected from the group consisting of

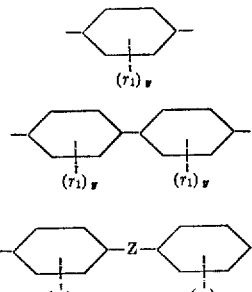

and

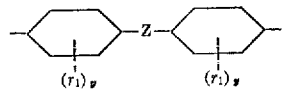

(wherein $r_1$ is a radical selected from the group consisting of —H, —lower alkyl, —O— lower alkyl, —halogen, —COOH, —OCH$_2$COOH and —SO$_3$H; $y$ is a whole number less than 3; and Z is a radical selected from the group consisting of —CH=CH—, —NHCO—, and —NHCONH—); $R_2$ is a radical selected from the group consisting of —H, —lower alkyl, —OCH$_2$COOH, —O— lower alkyl, —NH— acyl, lower alkyl—OH, and —O— lower alkyl OH; $z$ is a whole number less than 3; and Y is a radical selected from the group consisting of —CO—, —CO—CH=CR$_3$—CO— (wherein R$_2$ is a radical selected from the group consisting of —H, —Br, —Cl, and —CH$_3$),

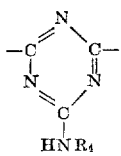

(wherein R$_4$ is a radical selected from the group consisting of —H, —lower alkyl, —phenyl, and lower alkylated phenyl),

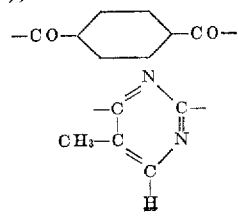

2

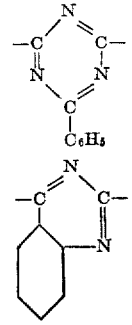

and

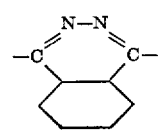

Hereinafter the above will sometimes be referred to as Structure I.

The dotted linkages, whenever shown indicate bonding of substituent groups to ring nuclei at any available positions in the entire ring structure providing stable linkages.

The triazole structure of the naphthotriazole moiety is sometimes illustrated in the following ways:

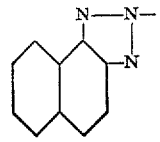

and

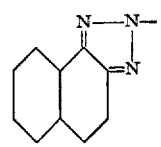

According to another aspect of the invention, it has been found that the amino-azo compounds referred to just below are useful as dye intermediates for the production of Structure I type compounds as well as other disazo dyes. These amino-azo compounds have the following structure (sometimes hereinafter referred to as Structure II):

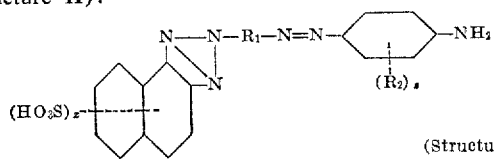

(Structure II)

wherein $R_1$, $R_2$, $x$ and $z$ represent the same substituents as in Structure I. Such amino-azo compounds can be effectively condensed with suitable reagents as more fully described hereinafter to produce various disazo dyes.

Structure I type compounds can be prepared by coupling a diazotized aminonitroaryl compound with a naphthylaminesulfonic acid. The amino-azo compound is then oxidized to form a nitroarylnaphthotriazole which compound is then reduced to form an aminoarylnaphthotriazole. The aminoarylnaphthotriazole so produced is diazotized. The diazotized aminoarylnaphthotriazole is then coupled in para position to an amine of the benzene series. This forms the amino-azo intermediate (Structure II) which is thereafter condensed with a suitable reagent as more fully hereinafter described to form the disazo dye.

The Structure II type compounds can also be produced by using acylamino-aminoaryl compounds in place of the nitro-aminoaryl compounds in the coupling reaction with the naphthylaminesulfonic acid. When proceeding in this manner, following the formation of the amino-azo compound and subsequent triazolation by means of a suitable oxidizing agent, the acylamino-arylnaphthotriazolesulfonic acid is saponified to the desired amino compound by the use of an alkaline or acidic hydrolytic agent.

Certain compounds according to Structure II above may also be prepared by an alternative method which is as follows: one mol of a diaminoaryl compound, e. g., benzidine, o-tolidine 4,4' - diamino - 3 - biphenylsulfonic acid, etc., which has been tetrazotized, and which gives a water soluble tetrazonium salt, is coupled by means of one of its diazonium groups to one mol of a suitable naphthylaminesulfonic acid. Upon completion of this coupling reaction, the second diazonium group of the tetrazonium salt is reacted with an amine of the benzene series which couples in para position (the order to these two couplings may be reversed in certain cases where desired), to produce a diamino-disazo dye. The latter is then oxidized by means of a suitable reagent, well known to those versed in the art of dyestuff manufacture, e. g., a cupric salt, to the corresponding Structure II compound.

In the various compounds of the present invention the sulfonic acid radicals can be substituted at different positions of the naphthotriazole nucleus than those shown in the illustrative examples. The number and positioning of the sulfonic acid radicals will depend on the structure of the naphthylaminesulfonic acid which is initially coupled with the diazotized aminonitroaryl or diaminoaryl compound. Useful naphthylaminesulfonic acids which permit coupling in ortho position to the amino group are for example: naphthionic acid, 6-amino-1-naphthalenesulfonic acid, 6-amino-2-naphthalenesulfonic acid, 7-amino - 1 - naphthalenesulfonic acid, 4-amino-2-naphthalenesulfonic acid, 3-amino-1, 5-naphthalenedisulfonic acid, 3-amino-2,7-naphthalenedisulfonic acid, 4-amino-1,6-naphthalenedisulfonic acid, 5-amino-2,7-naphthalenedisulfonic acid, 6-amino-1,3-naphthalenedisulfonic acid, 7 - amino - 1,3 - naphthalenedisulfonic acid, 8-amino-1,6-naphthalenedisulfonic acid, 7-amino-1,3,6-naphthalenetrisulfonic acid, 7 - amino - 2,4,6-naphthalenetrisulfonic acid, 8-amino-1,3,5-naphthalenetrisulfonic acid, 8-amino-1,3,6-naphthalenetrisulfonic acid, etc.

Useful dyes having good light-fast and wash-fast acteristics can be prepared from the mono, di and tri sulfonic acids of the naphthylamines. However, when the dyes are to be applied to fibrous materials containing a mixture of synthetics such as nylon or acetate and cellulosic fibers, it is preferred to have a total of 3 sulfonic acid radicals in the Structure II intermediate when $R_1$ is

to have a total of 3 or 4 sulfonic acid radicals in the Structure II intermediate when $R_1$ is

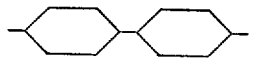

and to have a total of 4 sulfonic acid radicals in the Structure II intermediate when $R_1$ is

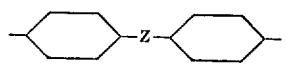

The reasons for this are that the dyes of this invention having fewer sulfonic acid groups tend to stain nylon and acetate, while a higher number of sulfonic acid groups tends to decrease the affinity of these dyes for the fiber.

In accordance with this invention, aminonitroaryl compounds which are useful are for example: p-nitroaniline, 2-amino-5-nitrobenzenesulfonic acid, 2-chloro-4-nitroaniline, 4-nitro-o-anisdine, 4-nitro-o-toluidine, 4'-nitro-4-biphenylamine, 4-amino-4'-nitrostilbene, 4-amino-4'-nitro-2,2'-stilbene-disulfonic acid, 4'-amino-4-nitrobenzanilide, 4-amino-4'-nitrocarbanilide, 4,4'-diamino-3,3' - biphenyldicarboxylic acid, 4,4' - diamino - 3,3'-biphenyldiglycollic acid, etc.

Acylamino-aminoaryl compounds which correspond to the nitroaminoaryl compounds above, as for example, 4'-aminoacetanilide, 2 - amino-5-acetaminobenzenesulfonic acid, 4' - acetamino - 4 - biphenylamine, 4'-acetamino-4-amino-2,2'-stilbenedisulfonic acid, etc., can also be coupled in a similar manner with naphthylamine-sulfonic acids in the production of dyes and dye intermediates of the type herein contemplated.

Oxidation of the nitro-amino-azo compounds to form the nitroarylnaphthotriazoles can be effected by means of reagents and techniques well known to those skilled in the art, as for example, by means of cupric ammonium hydroxide solution.

The reduction of the nitroarylnaphthotriazoles to form the aminoarylnaphthotriazoles can be effected in the usual manner, as for example by means of powdered iron in dilute acetic acid solution.

Diazotization of the amino-arylnaphthotriazole can be effected in any suitable manner, either directly or indirectly. Such diazotization reactions are well known to those skilled in the art.

Suitable arylamines for coupling with the diazotized aminoarylnaphthotriazoles are preferably those which can be coupled according to conventional techniques in para position to the amino group, and include such compounds as aniline, o-toluidine, m-toluidine, o-anisidine, m-anisidine, o-phenetidine, m-phenetidine, 5-methyl-o-anisidine, 3' - amino - acetanilide, 2,3 - xylidine, 2,5-xylidine, 2,6-xylidine, 3,5-xylidine, 2,5-dimethoxyaniline, 2,5-diethoxyaniline, 3'-aminoformanilide, 3'-amino-4'-methoxyacetanilide, o-amino-mandelic acid, m-aminophenethylalcohol, 2-(3'-amino) phenoxyethanol, etc.

In a preferred embodiment of this invention, two mols of an intermediate having Structure II are condensed with one mol of a condensing agent such as phosgene, a dicarboxylic acid dihalide, a cyanuric halide or a suitable heterocyclic dihalide which will yield radicals of the type given for Y in Structure I.

Such condensations can also be effected by terephthaloyl chloride, 1,4-dichlorophthalazine, 2,4-dichloro-6 - phenyl - s - triazine, 2,6-dichloro-5-methyl-pyrimidine, 2,4-dichloro-quinazoline.

To minimize cost of reactants in preparing compounds according to the invention, it is preferred to condense the Structure II type compounds with reagents which will give Y radicals such as —CO—, —CO—CH=CR$_3$—CO— and

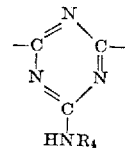

wherein $R_3$ and $R_4$ represent substituent groups according to Structure I above.

Still further in order to minimize material costs and also to simplify the production technique, it is preferred that the $R_1$ radicals of Structure I be selected from the following group:

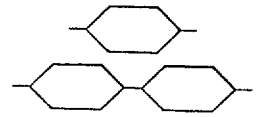

and

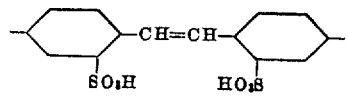

Particularly good dye characteristics such as light-fastness and wash-fastness are obtained where the Y linkage and the $R_1$ radicals are selected from the groups referred to just above and where, in addition, the $R_2$ radicals of Structure I above are selected from the following groups:

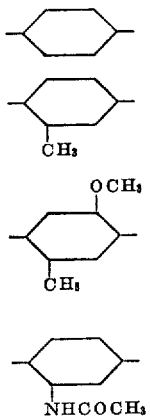

and

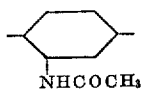

When fumaroyl chloride and cyanuric chloride are used to condense the amino-azo intermediates which form yellow dyes, the dyes so produced tend to be somewhat greener than when the same azo intermediates are condensed with phosgene. Cyanuric chloride is highly desirable as a condensing reagent for the azo compounds because it permits the formation of unsymmetrical dye molecules and in this way it is possible to vary the shade of the color and the dyeing properties of the dyestuff.

When cyanuric chloride is used as the condensing reagent the third chlorine can be replaced by reacting the condensation product with aniline as described in Example 5, or by the use of other reagents such as ammonia, lower alkyl amines or lower alkylated anilines.

Equivalent amounts of other condensing agents, such as fumaroyl bromide or dichlorides or dibromides of maleic, mesaconic, citraconic, bromofumaric, chlorofumaric, chloromaleic or bromomaleic acids, can be used in lieu of fumaroyl chloride to effect condensations of the type generally illustrated by Example 18.

These new disazo compounds are water soluble and are particularly useful as substantive dyes to impart yellow and orange shades to cellulosic fibers. A wide variety of color shades are obtainable by employing various of the compounds contemplated. When used as dyestuffs, they have been found to possess excellent affinity for cellulose; they show outstanding dyeing properties; the colors are fast to light and the dyeings have good wash-fastness. The wash-fastness and light-fastness of the colors are not adversely affected by conventional after-treatments with heat hardenable resins used in various fabric finishing processes to impart desirable properties or effects to the fabric (e. g., stabilization, crease-proofing, durabilizing mechanical finish effects, etc.), and conventional dye fastening agents (usually cationic resinous materials or amino-aldehyde condensation products) used to increase wash-fastness of the dyeings have a far less adverse effect on the light-fastness of the dyes of this invention than on comparable yellow and orange dyes heretofore available.

A rather striking characteristic of these new disazo dyes is their high light-fastness even though the dye molecule is not "metallized" (i. e., does not contain copper). Therefore, these dyes can be used in many instances where the combination of wash and light-fastnesses are desirable but where metallized dyes are unsuitable, e. g., in the dyeing of rubber-backed fabrics.

Compounds according to the invention can be prepared as set forth in the following illustrative examples. In these examples, unless otherwise indicated, parts are by weight, temperature is given in degrees centigrade and percentages are percentages by weight.

*Example 1*

50.0 parts of the compound of the formula

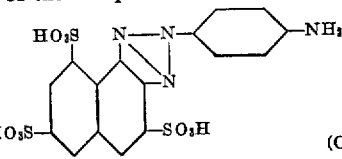

(Compound I*a*)

(sometimes hereinafter referred to as Compound I*a* which can be prepared by coupling diazotized p-nitroaniline with 8-amino-1,3,6-naphthalenetrisulfonic acid, oxidizing the amino-azo dye thus produced to the corresponding 2-(4'-nitrophenyl) naphtho-(1,2)triazole - 4,7,9 - trisulfonic acid, and reducing the nitro group to an amino group) is diazotized directly in aqueous solution at 0° and coupled with 10.7 parts of m-toluidine at pH 3.0–4.0. This aminoazo dye (sometimes hereinafter referred to as Compound I*b*) is then reacted with phosgene at 25–40° and pH 6.5–7.5 in aqueous solution until free amino group is no longer detectable. The resultant new dye is then filtered and dried. It has the formula

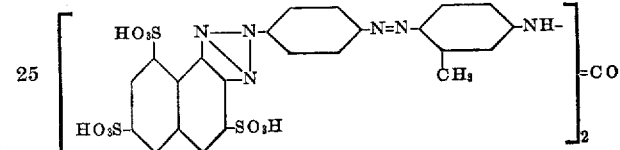

and is a yellow-brown powder which dyes cotton and regenerated cellulose in yellow shades of excellent light and washing fastness.

*Example 2*

50.0 parts of Compound I*a* is diazotized directly and coupled at 0° with 15.0 parts of 3'-aminoacetanilide in aqueous solution at pH 3.0–4.5. The amino-azo dye thus produced is then reacted with phosgene in aqueous solution at 25–40° and at pH 6.5–7.5 until free amino group is no longer detectable. The resultant new dye is separated from solution by addition of 5% of sodium chloride, filtered and dried. It has the formula

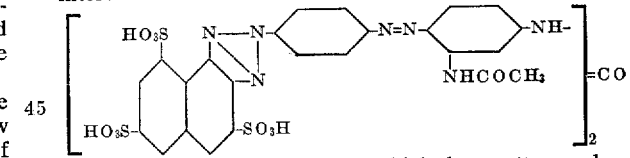

and is a brown-yellow powder which dyes cotton and regenerated cellulose directly from aqueous solution in yellow-orange shades of very good fastness to light and to washing.

*Example 3*

In Example 1, while otherwise proceeding as described, if the 10.7 parts of m-toluidine are replaced with 13.7 parts of 5-methyl-o-anisidine, a new dye is produced which has the formula

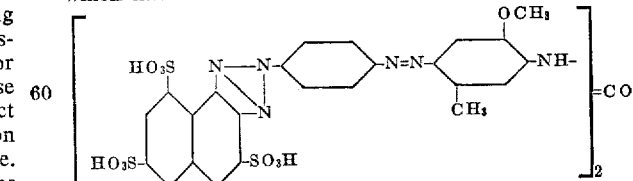

It is a red-brown powder which dyes cotton and regenerated cellulose in orange shades of excellent fastness to washing and very good fastness to light.

*Example 4*

61.8 parts of the amino-azo compound (Compound I*b*), prepared as described in Example 1, are dissolved in neutral aqueous solution, by means of 900 parts of water, at 40°. While stirring, vigorously, a solution of 9.2 parts of cyanuric chloride in 50 parts of acetone, and another solution containing sodium carbonate in water, are added dropwise slowly to the dye solution, the sodium carbonate being added in sufficient amount to keep the reaction at pH 6.5 to 7.5. After the cyanuric chloride solution has been added, the temperature is maintained at 40° for thirty minutes, then raised to 90°, and 4.7 parts of aniline added, and the temperature maintained at 90° for an additional hour. The new dye is separated by addition of sodium chloride, filtered, and dried. It is a yellow-brown powder which dyes cotton and regenerated cellulose in yellow shades of excellent fastness to light and washing, and it has the formula:

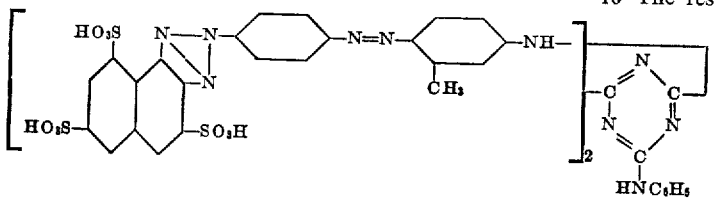

Example 5

A solution is prepared from 18.4 parts of benzidine, 30 parts of 30% hydrochloric acid and 200 parts of water at 90°. The solution is allowed to cool to 60°; 20 parts of 30% hydrochloric acid are added; and the resultant suspension of benzidine dihydrochloride is cooled to 10° by the addition of ice. Then 14 parts of sodium nitrite, as a 30% solution in water, are added during five minutes, the temperature being maintained at 10° by further addition of ice as needed. After completion of the diazotization, the excess of nitrous acid is removed by addition of sulfamic acid, in amount sufficient to produce a negative test when the clear tetrazonium salt solution is spotted on starch-iodide paper.

Ice is then added to the solution to lower the temperature to 0°, and 30 parts of sodium bicarbonate are sifted into the solution. 25 parts of pyridine are added, followed immediately by a solution prepared from 42 parts of 8-amino-1,3,6-naphthalenetrisulfonic acid, 100 parts of water and sufficient sodium carbonate to raise the pH of the solution to 7.5. Coupling is allowed to proceed at 0–5° for 16 hours. The pH of the mixture is then lowered to 5.5 with 25 parts of glacial acetic acid, and a solution of 12 parts of m-toluidine in 25 parts of water and 12 parts of 30% hydrochloric acid is added. The temperature of the coupling is allowed to rise to 20° during three hours. The coupling mixture is then treated with 28 parts of sodium hydroxide and the temperature is raised to 90° and held at this temperature during the addition of 50 parts of crystalline copper sulfate pentahydrate, and for one hour additional. 100 parts of 30% hydrochloric acid are then added, and the precipitated hydrochloride of the intermediate of the formula

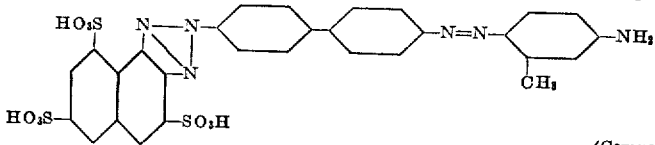

(hereinafter sometimes referred to as Compound V*b*) is filtered. This amino-azo compound is further purified by dissolving it in 1500 parts of water with the addition of sodium hydroxide to raise the pH to 11, heating to 95°, adding 30 parts of activated charcoal and 50 parts of a siliceous filtering aid, filtering, and salting the amino-azo compound from solution by addition of sodium chloride. After filtering the intermediate, it is reacted in aqueous solution at pH 6.5–7.5 and at 25° to 50° with phosgene until free amino group is no longer present. The resultant new dye is precipitated from solution by addition of sodium chloride, filtered and dried. It has the formula

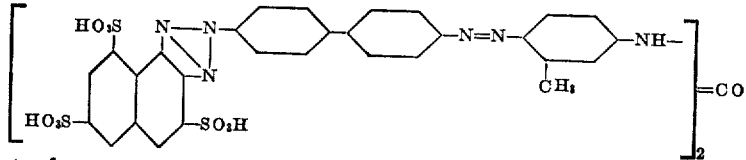

and is a yellow-brown powder which dyes cotton and regenerated cellulose in clear yellow shades of excellent fastness to light and to washing.

Example 6

68.3 parts of the compound of the formula

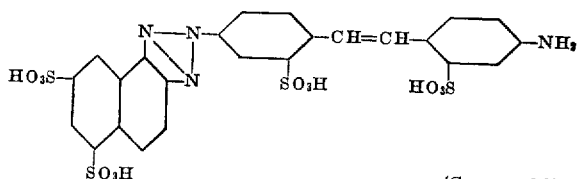

(Compound VI*a*)

(hereinafter sometimes referred to as Compound VI*a*, prepared by coupling diazotized 4-amino-4'-nitro-2,2'-stilbenedisulfonic acid with 6-amino-1,3-naphthalenedisulfonic acid, oxidizing the nitro-amino-azo compound thus produced with cupric ammonium hydroxide solution to the corresponding nitro-naphtho (1,2)triazone, and reducing the nitro group with iron powder in dilute acetic acid solution) are diazotized directly in aqueous solution, and coupled at pH 3.5–4.5 with 10.7 parts of m-toluidine. The amino-azo compound thus produced is then reacted with phosgene in aqueous solution at pH 6.5–7.5 and 25° to 50° until free amino group is no longer present. The new dye which precipitates is filtered and dried. It is an orange-brown powder which dyes cotton and regenerated cellulose in yellow shades of excellent fastness to light and to washing. It has high tinctorial strength and has the formula

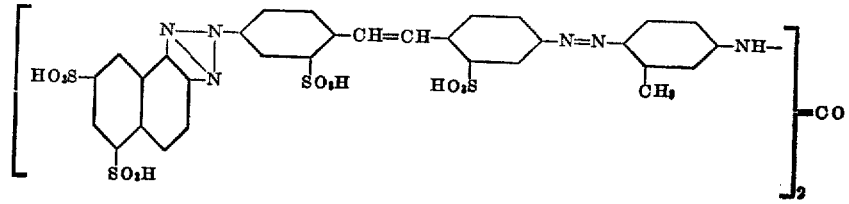

Example 7

68.3 parts of the Compound VIa are diazotized directly and coupled at pH 4.5 to 5.5 with 18.7 parts of anilino-methanesulfonic acid in aqueous solution at 0°. Upon completion of the coupling reaction, enough sodium hydroxide is added to produce a 4% NaOH solution. The temperature of the reaction is maintained at 90° for one hour, at the end of which time the amino-azo dye of the formula

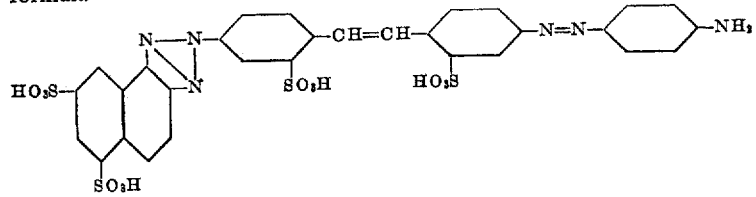

is isolated by neutralization of the reaction with concentrated hydrochloric acid and addition of sodium chloride. The amino-azo dye, further purified, if desired, by reprecipitation from acid solution and then from alkaline aqueous solution with sodium chloride, is reacted in aqueous solution at pH 6.5–7.5 and 25–40° with phosgene, until free amino group is no longer detectable. The resultant new dye is then filtered and dried. It has the formula

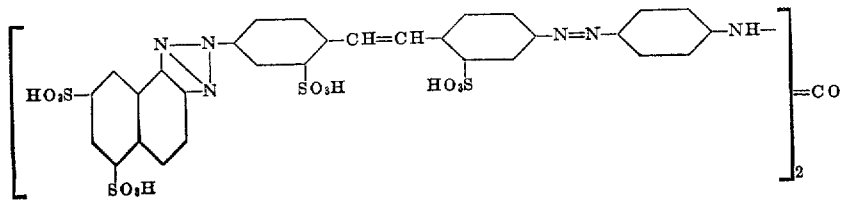

and is a yellow-brown powder which dyes cotton and regenerated cellulose in yellow shades of excellent fastness to light and to washing.

Example 8

60.3 parts of the compound of the formula

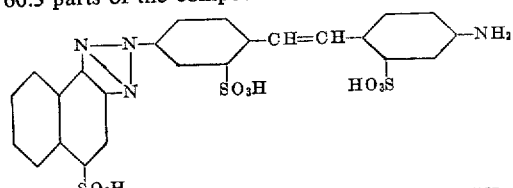

(prepared in the same manner as Compound VIa but using naphthionic acid instead of the 6-amino-1,3-naphthalenedisulfonic acid) are diazotized indirectly in aqueous solution at 0°, and coupled at pH 3.0–4.0 with 10.7 parts of m-toluidine. The amino-azo dye thus produced is then reacted with phosgene at 25–60° and pH 6.5–7.5 until free amino group is no longer detectable. The resultant new dye which precipitates is then filtered and dried. It is a yellow-brown powder which dyes cotton and regenerated cellulose in yellow shades of excellent fastness to light and washing. It has the formula

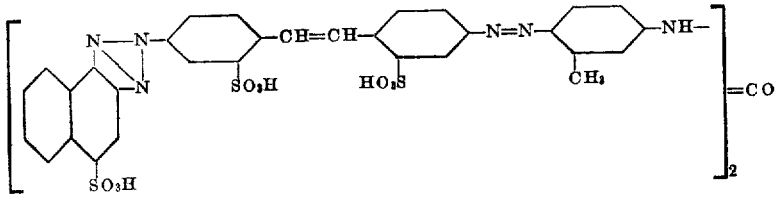

Example 9

68.3 parts of the Compound VIa are diazotized directly in aqueous solution and coupled at pH 3.0–4.0 with 10.7 parts of m-toluidine. The amino-azo compound thus produced is dissolved in neutral aqueous solution with the addition of sodium carbonate. While stirring vigorously, a solution of 7.65 parts of fumaroyl chloride in 40 parts of benzene, and a sodium carbonate solution are added dropwise to the dye solution at 25–30°, the sodium carbonate solution being added in sufficient amount to keep the reaction constantly approximately neutral. After all the fumaroyl chloride has been added, stirring is continued until no more free amino group can be detected. Then the new dye is separated from solution with the aid of sodium chloride, and the precipitated dye is filtered and dried. It is an orange-brown powder which has the formula

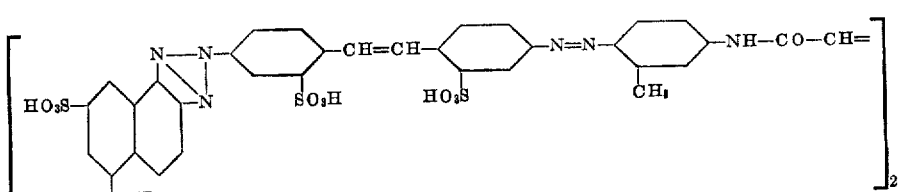

and which dyes cotton and regenerated cellulose in yellow shades of excellent light and washing fastness.

Example 10

68.3 parts of Compound VIa are diazotized and coupled with 10.7 parts of m-toluidine as described in Example 6. The amino-azo compound thus produced is dissolved in neutral aqueous solution at 40°. While stirring vigorously, a solution of 9.2 parts of cyanuric chloride in 50 parts of acetone, and another solution of sodium carbonate, are added slowly, dropwise, to the dye solution, the sodium carbonate solution being added in sufficient amount to keep the reaction at pH 6.5–7.5. After the cyanuric chloride solution has been added completely, the temperature is maintained at 40° for 30 minutes, and the pH is maintained at 6.5–7.5. Then the temperature is raised to 90° and 4.7 parts of aniline are added. The temperature is maintained at 90° for an additional hour. The new dye, thus produced, is separated from solution by salting, filtered and dried. It is an orange-brown powder which dyes cotton and regenerated cellulose in yellow shades of excellent fastness to light and washing. It has the formula

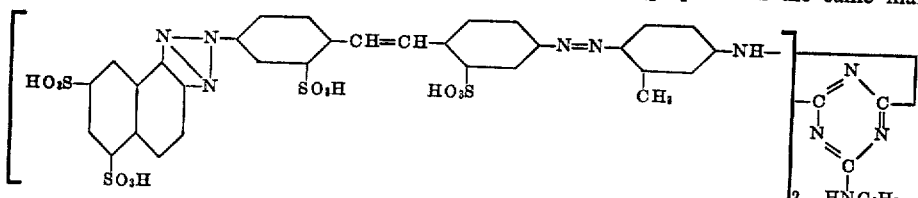

Example 11

In Example 6, while otherwise proceeding as described, if the 10.7 parts of m-toluidine are replaced with 13.7 parts of 5-methyl-o-anisidine, a new compound is produced which has the formula

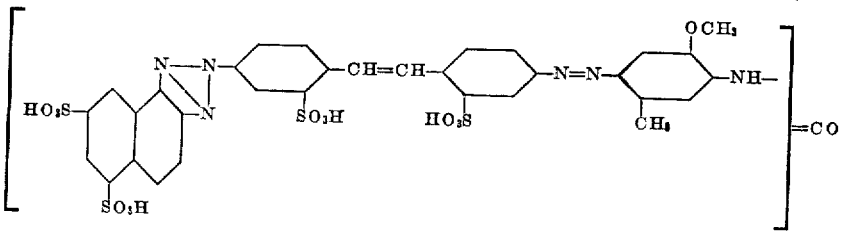

It is a red-brown powder which dyes cotton and regenerated cellulose in orange shades of excellent fastness to light and to washing.

Example 12

In Example 6, while otherwise proceeding as described, if the 10.7 parts of m-toluidine are replaced with 15.0 parts of 3'-aminoacetanilide, a new dye is produced which dyes cotton and regenerated cellulose in orange-yellow shades of very good fastness to light and to washing. It is an orange-brown powder which has the formula

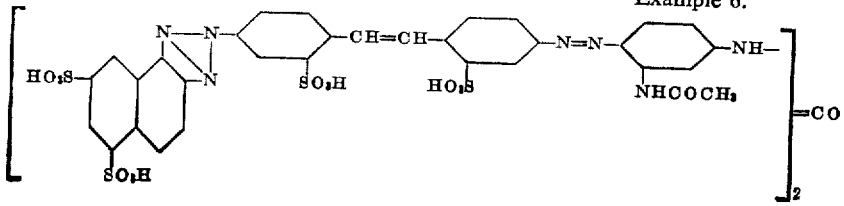

Example 13

In Example 6, while otherwise proceeding as described, if Compound VIa is replaced with 68.3 parts of the compound of the formula

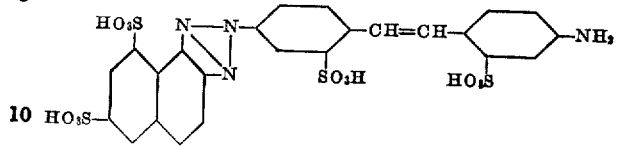

(prepared in the same manner as Compound VIa but

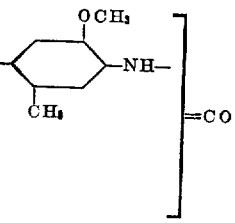

using 7-amino-1,3-naphthalenedisulfonic acid instead of 6-amino-1,3-naphthalenedisulfonic acid) a new dye is produced which has similar properties to that of Example 8. It has the formula

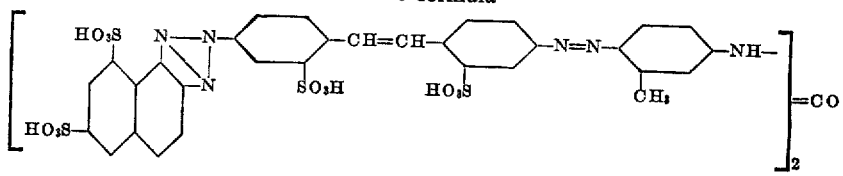

Example 14

In Example 6, while otherwise proceeding as described, if the Compound VIa is replaced with 68.3 parts of the compound of the formula

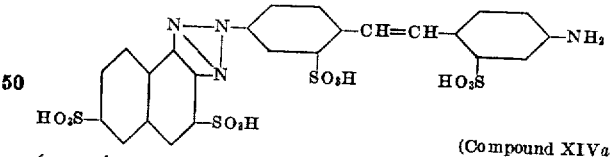

(Compound XIVa)

(sometimes hereinafter referred to as Compound XIVa, prepared in the same manner as Compound VIa but using 3-amino-2,7-naphthalenedisulfonic acid instead of 6-amino-1,3-naphthalenedisulfonic acid) a new dye is produced which has the formula

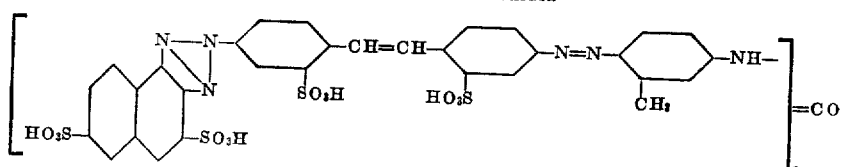

and which has similar properties to the dye produced in Example 6.

Example 15

In Example 9, while otherwise proceeding as described, if the 68.3 parts of Compound VIa are replaced with 68.3 parts of Compound XIVa, a new dye is produced which has the formula

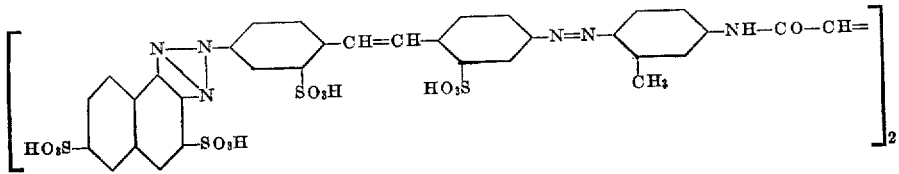

and which has similar properties to the dye produced in Example 9.

Example 16

In Example 10, while otherwise proceeding as described, if the 68.3 parts of Compound VIa are replaced with 68.3 parts of Compound XIVa, a new dye is produced having similar properties to those of the dye produced in Example 10, but having the formula

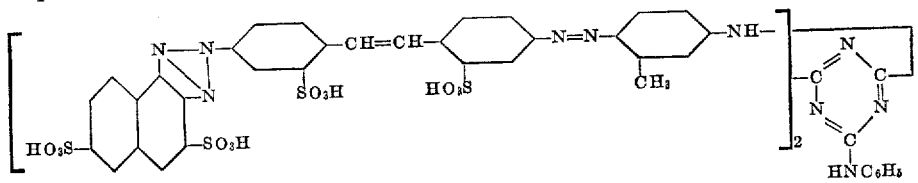

Example 17

50 parts of Compound Ia are dissolved at pH 7 in 500 parts of water at 75°. To this solution are added 1 part of a non-ionic surface-active dispersing agent, 25 parts of sodium acetate and 25 parts of p-nitrobenzoyl chloride

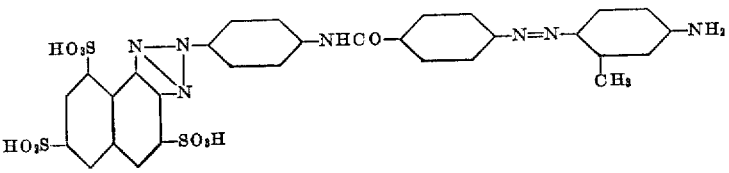

with vigorous agitation. After ten minutes at 75°, the temperature is raised to 95° and 50 parts of iron powder are added during 15 minutes. The temperature is then held at 95–100° for 30 minutes, the reaction is made alkaline by the addition of sodium carbonate until the pH is 9.0, and the solution of the compound of the formula

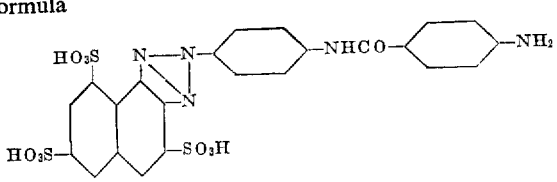

is filtered to free it of precipitated inorganic material. To the clear pale-yellow solution is added 10% of sodium chloride. Cooling the solution with stirring produces a precipitate which is filtered. The latter precipitate is redissolved in 500 parts of water and further purified by reprecipitation at 25° by means of 30% hydrochloric acid to pH 1.5 and filtration. The intermediate thus produced is then diazotized indirectly by solution at pH 7 in 500 parts of water, addition to the solution of 4 parts of sodium nitrite, and addition of the solution thus obtained to 20 parts of 30% hydrochloric acid and ice sufficient to keep the temperature at 0° for a period of two hours. Excess nitrous acid is removed by the addition of enough sulfamic acid to produce a negative test when the diazotization mixture is spotted on starch-iodide paper. 6 parts of m-toluidine are then added and the pH is adjusted to 3.0–3.5 with sodium acetate solution until coupling is completed. The amino-azo compound thus produced is filtered at 20° and at pH 1.5; the filter cake is redissolved at pH 8 in 500 parts of water, purified by addition at 70° of 10 parts of activated charcoal and filtration.

The solution of the amino-azo compound thus produced which has the formula

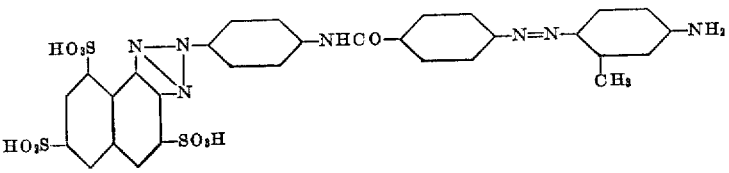

is then reacted at pH 6.5–7.5 and 25°–60° with phosgene until free amino group is no longer detectable. The resultant new dye is filtered and dried. It is an orange powder which dyes cotton and regenerated cellulose in yellow shades having excellent fastness to light and to washing. It has the formula

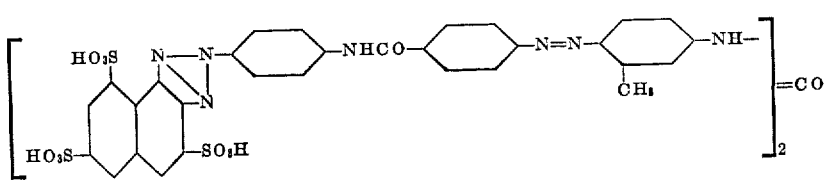

Example 18

69.5 parts of the amino-azo Compound Vb used to prepare the dye in Example 5 are reacted with 7.65 parts of fumaroyl chloride. While vigorously stirring the dye intermediate solution, a solution of 7.65 parts of fumaroyl chloride in 40 parts of benzene, and a sodium carbonate solution are added dropwise to the dye solution at 25–30°, the sodium carbonate solution being added in sufficient amount to keep the reaction constantly approximately neutral. After all the fumaroyl chloride has been added, stirring is continued until no more free amino group is present. Then the new dye is separated from solution by salting with sodium chloride and the precipitated dye is filtered and dried. The new dye produced is a yellow-brown powder which dyes cotton and regenerated cellulose in yellow shades of excellent fastness to light and washing. It has the formula

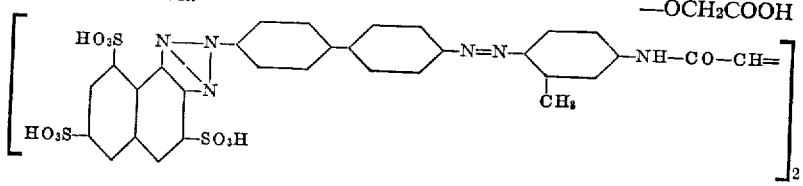

Example 19

69.5 parts of the amino-azo Compound Vb used to prepare the dye of Example 5 are dissolved in neutral aqueous solution at 40°. While stirring vigorously, 9.2 parts of cyanuric chloride in 50 parts of acetone and another solution of sodium carbonate are added slowly dropwise to the dye intermediate solution, the sodium carbonate solution being added in sufficient amount to keep the reaction at pH 6.5–7.5. After the cyanuric chloride solution has been added completely, the temperature is maintained at 40° for 30 minutes and the pH maintained at 6.5–7.5. Then the temperature is raised to 90° and 4.7 parts of aniline are added. The temperature is maintained at 90° for an additional hour. The new dye, thus produced, is separated from solution by salting, filtered and dried. The new dye produced is a yellow-brown powder which dyes cotton and regenerated cellulose in yellow shades of excellent fastness to light and washing. It has the formula

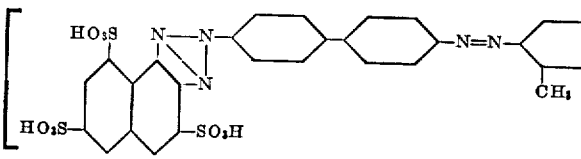

Example 20

The disazo compound (0.5 part), obtained according to Example 6, is dissolved in a dyebath which contains 2000 parts of water. Cotton (100 parts) is entered at 40–50°; the bath is heated to 90–95° within 30 minutes; 20 parts of sodium chloride are added; and dyeing is performed for 30 minutes more at this temperature. The dyebath is then well-exhausted of color. The dyed fabric is rinsed cold and dried. The cotton is dyed a reddish-yellow shade of excellent fastness to light and very good fastness to washing.

The dyed fabric, when after treated with urea-formaldehyde in the usual manner well-known in the trade, shows markedly increased fastness to washing with no decrease in light fastness.

I claim:

1. A disazo compound having the following structure

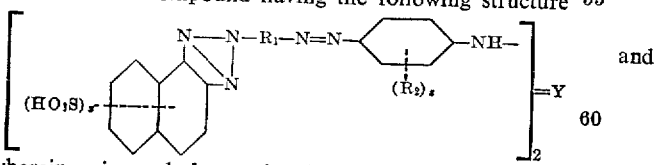

wherein $x$ is a whole number less than 4; $R_1$ is a radical selected from the group consisting of

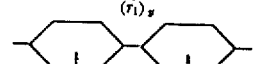

and

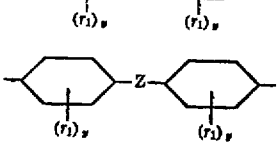

$r_1$ being a radical selected from the group consisting of —H, -lower alkyl, —O-lower alkyl, —Cl, —COOH, —OCH$_2$COOH and —SO$_3$H; $y$ being a whole number less than 3; and Z being a radical selected from the group consisting of —CH=CH—, —NHCO—, and

—NHCONH—;

$R_2$ is a radical selected from the group consisting of —H, -lower alkyl, —OCH$_2$COOH, —O-lower alkyl, —NH-acyl, -lower alkyl—OH, and —O-lower alkyl—OH; $z$ is a whole number less than 3 and Y is a radical selected from the group consisting of —CO—,

—CO—CH=CR$_3$—CO—,

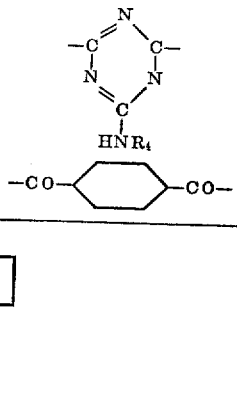

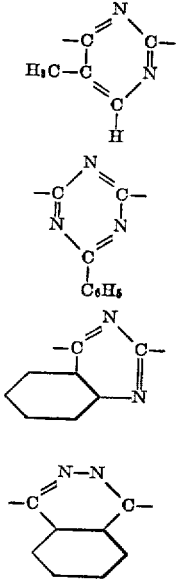

$R_3$ being a radical selected from the group consisting of —H, —Cl, —Br, and —CH$_3$ and $R_4$ being a radical selected from the group consisting of —H, -lower alkyl, -phenyl, and -lower alkyl phenyl.

2. A disazo compound having the following structure:

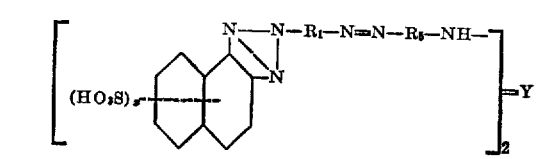

17 wherein:

$x$ is a whole number less than 4;
$R_1$ is a radical selected from the group consisting of

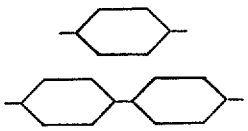

and

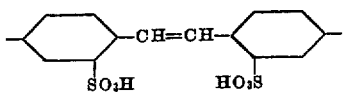

$R_5$ is a radical selected from the group consisting of

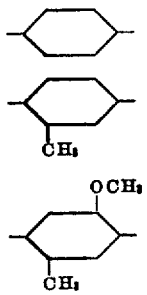

and

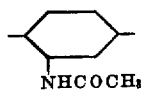

and Y is a radical selected from the group consisting of

—CO—, —CO—CH=CR₃—CO— and

-C(=N)-N=C(-NHR₄)-N=C-

$R_3$ being a radical selected from the group consisting of —H, —Br, —Cl, and —CH₃, and
$R_4$ being a radical selected from the group consisting of —H, -lower alkyl, -phenyl and -lower alkylated phenyl.

3. A compound according to claim 2 wherein $R_1$ is

⎯⟨⎯⟩⎯ and $x$ is 3.

18

4. A compound according to claim 2 wherein $R_1$ is

⎯⟨⎯⟩⎯⟨⎯⟩⎯ and $x$ is 3.

5. A compound according to claim 2 wherein $R_1$ is

⎯⟨SO₃H⎯⟩⎯CH=CH⎯⟨HO₃S⎯⟩⎯ and $x$ is 2.

6. A compound according to claim 2 wherein Y is —CO—.

7. A compound according to claim 2 wherein Y is —CO—CH=CR₃—CO— and $R_3$ is a radical selected from the group consisting of —H, —Br, —Cl, and —CH₃.

8. A compound according to claim 2 wherein Y is

-C(=N)-N=C(-NHR₄)-N=C- and $R_4$ is a radical selected from the group consisting of —H, -lower alkyl, -phenyl, and -lower alkylated phenyl.

9. The compound

[HO₃S-naphthotriazole-phenyl-N=N-phenyl(CH₃)-NH-]₂=CO

10. The compound

[HO₃S-naphthotriazole-phenyl-N=N-phenyl(CH₃)-NH-triazine(HNC₆H₅)]₂

11. The compound

[HO₃S-naphthotriazole-phenyl(SO₃H)-CH=CH-phenyl(HO₃S)-N=N-phenyl-NH-]₂=CO

References Cited in the file of this patent

UNITED STATES PATENTS

| | | |
|---|---|---|
| 820,052 | Kirchhoff et al. | May 8, 1906 |
| 2,004,250 | Schindhelm et al. | June 11, 1935 |
| 2,270,478 | Schmid | Jan. 20, 1942 |
| 2,385,862 | Keller | Oct, 2, 1945 |
| 2,467,262 | Knight | Apr. 12, 1949 |
| 2,673,198 | Grandjean | Mar. 23, 1954 |

FOREIGN PATENTS

| | | |
|---|---|---|
| 183,453 | Switzerland | June 16, 1936 |

UNITED STATES PATENT OFFICE

Certificate of Correction

Patent No. 2,795,577

June 11, 1957

James F. Feeman

It is hereby certified that error appears in the above numbered patent requiring correction and that the said Letters Patent should read as corrected below.

In the grant, lines 2 and 3, for "assignor to Althouse Chemical Co., of Worcester, Massachusetts, a corporation of Massachusetts" read —assignor to Althouse Chemical Co., a division of Crompton & Knowles Corporation (a corporation of the Commonwealth of Massachusetts), of Worcester, Massachusetts—; line 12, for "Althouse Chemical Co., its successors" read —Althouse Chemical Co., a division of Crompton & Knowles Corporation, its successors—; in the heading to the printed specification, lines 3, 4, and 5, for "assignor to Althouse Chemical Co., Worcester, Mass., a corporation of Massachusetts" read —assignor to Althouse Chemical Co., a division of Crompton & Knowles Corporation (a corporation of the Commonwealth of Massachusetts), Worcester, Mass.—; in the printed specification, column 1, line 52, for "$R_2$" read —$R_3$—; column 3, line 14, after "o-tolidine" insert a comma; line 21, for "to these" read —of these—; column 4, line 1, for "anisdine" read —anisidine—; line 19, after "solution" change the comma to a period; column 8, line 50, for "triazone" read —triazole—; column 11, a subscript —2— should appear after the right-hand bracket in the formula illustrated in Example 11; column 16, lines 58 to 62, the formula should appear as shown below instead of as in the patent—

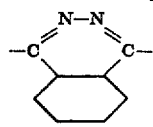

Signed and sealed this 29th day of April 1958.

[SEAL]

Attest:
KARL H. AXLINE,
*Attesting Officer.*

ROBERT C. WATSON,
*Commissioner of Patents.*